(12) United States Patent
Ciotola

(10) Patent No.: US 6,250,642 B1
(45) Date of Patent: Jun. 26, 2001

(54) CLIPS USEFUL FOR A MECHANICAL SEAL

(76) Inventor: Alfredo A. Ciotola, 6 Trinity Pl., Warren, NJ (US) 07059

( * ) Notice: Subject to any disclaimer, the term of this patent is extended or adjusted under 35 U.S.C. 154(b) by 1151 days.

(21) Appl. No.: 08/705,744

(22) Filed: Aug. 30, 1996

Related U.S. Application Data

(62) Division of application No. 08/115,240, filed on Sep. 2, 1993, now Pat. No. 5,577,739.

(51) Int. Cl.⁷ .................................................. F16J 15/34
(52) U.S. Cl. .......................................................... 277/370
(58) Field of Search ............................. 277/9, 9.5, 81 R, 277/11

(56) References Cited

U.S. PATENT DOCUMENTS

| | | | |
|---|---|---|---|
| 1,993,268 | 3/1935 | Ferguson | 277/92 |
| 2,037,144 | 4/1936 | Olson | 277/40 |
| 2,270,651 | 1/1942 | Doyle | 277/92 |
| 2,462,481 | 2/1949 | Estey | 277/92 |
| 2,615,739 | 10/1952 | Vedovell | 277/41 |
| 2,879,093 | 3/1959 | Dolhun | 277/41 |
| 3,601,412 * | 8/1971 | Malmstrom | 277/11 |
| 3,715,169 | 2/1973 | Molis | 277/81 R |
| 4,176,848 | 12/1979 | Lafuze | 277/92 |
| 4,212,474 | 7/1980 | Arai | 277/144 |
| 4,256,313 * | 3/1981 | Arnold | 277/11 |
| 4,332,391 * | 6/1982 | Arnold | 277/11 |
| 4,625,977 | 12/1986 | Azibert et al. | 277/82 |
| 4,639,000 | 1/1987 | Warner | 277/41 |
| 4,832,351 | 5/1989 | Ciotola | 277/81 R |
| 4,989,882 | 2/1991 | Warner et al. | 277/11 |
| 4,993,720 | 2/1991 | Ciotola | 277/27 |
| 5,071,139 | 12/1991 | Warner | 277/27 |
| 5,114,163 | 5/1992 | Radosav et al. | 277/92 |
| 5,209,496 | 5/1993 | Azibert et al. | 277/9 |
| 5,275,421 * | 1/1994 | Hornsby | 277/9 |
| 5,294,132 * | 3/1994 | Duffee et al. | 277/11 |

FOREIGN PATENT DOCUMENTS

| 205749 | 2/1957 | (AU) | 277/39 |
|---|---|---|---|
| 1495553 | 7/1989 | (SU) | 277/96.1 |

* cited by examiner

Primary Examiner—James R. Brittain
Assistant Examiner—John L. Beres
(74) Attorney, Agent, or Firm—Roberts & Mercanti, LLP

(57) ABSTRACT

An improved mechanical seal of the type useful to form a seal between a stationary housing and a rotatable shaft having a shaft axis extending through an opening in the housing. The mechanical seal has stationary components and rotatable components. The stationary components comprise a stationary seal element having a stationary seal surface and the rotatable components comprise a rotatable seal element having a rotatable seal surface. The stationary and rotatable seal surfaces have substantially equal and oblique, preferably, acute, angles to the shaft axis. The seal surfaces oppose each other and are forced together to form a seal. The seal can be secured in place by improved connector clips.

6 Claims, 5 Drawing Sheets

CLIPS USEFUL FOR A MECHANICAL SEAL

This is a divisional of application Ser. No. 08/115,240 filed on Sep. 2, 1993 now U.S. Pat. No. 5,577,739.

BACKGROUND OF THE INVENTION

1. Field of the Invention

The present invention relates to mechanical seals, and more particularly to a mechanical seal having angular opposing stationary and rotatable sealing surfaces.

2. Description of the Related Art

Moving parts such as rotating shafts extend from equipment such as pumps. Various means, such as packing can be interposed between stationary elements of the equipment and the rotating element. Particularly useful seals are mechanical seals. A mechanical seal provides a seal between the rotatable element, typically a shaft, and a stationary housing of an apparatus, typically containing fluid. Such seals are often associated with a fluid pump having a shaft extending through a pump housing wall. The pump shaft can be coupled to a motor through a motor shaft. The mechanical seal forms a seal between the pump shaft and the outer surface of the pump housing. Mechanical seals for such applications are commercially available and are described in U.S. Pat. Nos. 4,639,000; 4,832,351; 4,989,882; and 4,993,720. Such seals endure rigorous environments and last for extended time periods.

Seals which are known in the art comprise rotatable components and stationary components which contact to form a seal at opposing sealing surfaces. The rotatable components include a shaft attachment means. Such a means is typically a sleeve or ring having an inner perimeter surface which sealingly fits around the outer perimeter surface of the shaft and is connected to the shaft by connecting means such as set screws. A seal means such as an "O" ring typically provides a seal between the shaft and the sleeve. There is a rotatable circumferential seal element interconnected to the sleeve so as to rotate when the shaft and sleeve rotate. The sleeve extends axially along the shaft.

The stationary components comprise a gland which extends circumferentially around the shaft. The gland abuts against the outer housing surface around the shaft. There is a sealing means, typically a sealing gasket, interconnected to the gland and located between the gland and the housing. The gland functions as a base by which a seal element is attached to the housing. The connection is typically accomplished by bolts extending from the outer housing wall. The bolts are connected to the gland by suitable means such as passing through slots or connecting extenstions extending radially from the gland. The bolts extend through the connecting slots or connecting extensions and are secured with nuts.

A stationary seal element is located between the inner circumferential surface of the gland facing the shaft (i.e. the gland inner surface) and the shaft. The stationary seal element can be directly or indirectly connected to the stationary gland. There are suitable means such as described in U.S. Pat. Nos. 4,832,351 and 4,989,882 to axially center the various stationary elements on the shaft. A circumferential spacing is maintained between the stationary elements, and the shaft and various of the rotating elements.

The stationary and rotatable components meet at opposing sealing surfaces of the rotatable and stationary seal elements. One element is a hard element made of a material such as silicon carbide and the other sealing element is a soft element made of a material such as carbon. There is typically a spring means which forces either one of the seal elements toward the opposing seal element to cause the opposing surfaces to be pressed together. One opposing seal element has restricted axial movement and the surface of the opposing seal element is forced by the spring against the surface of the restricted seal element. Thereby, a seal is formed between the opposing sealing surfaces, i.e., the rotatable and stationary sealing elements.

Opposing rotatable and stationary sealing surfaces known in the art are perpendicular to an axis through the shaft. A problem with such seals is that the shaft typically has some axial play and therefore does not rotate precisely around the shaft axis. The path of one seal surface relative to the other is defined as a track for the purpose the present invention. If the shaft rotates axially perfectly the sealing surfaces would track perfectly around the circumference of the seal surfaces. As the softer seal element wears, a track pattern forms. Because the shaft rotation is not axially perfect, the rotating seal face wipes across the stationary seal face. The track that forms becomes radially wider than the width of one of the seal elements and a leak forms.

Although known seals are effective to provide a mechanical seals, improvements to prevent fluid leaking at the surface are a continuing goal. This is particularly the case which the seal is used under severe conditions. Such conditions are present when using the mechanical seal with large and heavy pieces of equipment and under conditions where fluid pressure may be continually or intermittently high.

Mechanical seals can comprise one or more one piece circumferential elements which fit over the shaft upon assembly. A specific type of mechanical seal known as a split seal comprises rigid elements which each have two circuferential sections which are connected around the shaft. The sections are circumferentially "split". Various of the rigid sections, including the mechanical seal elements, adaptors, glands, etc. are split. Various elastic seals used can open at one or two points. The advantage of the split mechanical seal is that it can be installed, and maintained without having to disassemble the equipment associated with the shaft to slip a seal apparatus over the end the shaft. The split seal is particularly useful in the maintenance on heavy equipment having shafts of from one to twelve inches or more.

U.S. Pat. No. 5,114,163 discloses a split mechanical face seal having a sealing element that seals a primary ring against a shaft and rigidly positions the primary ring in the axial, circumferential and radial directions. The split seal also includes a sealing element which seals a mating ring against the housing and non-rigidly positions the mating ring in the axial direction while simultaneously providing an axial biasing force on the mating ring to provide mating contact of the two rings.

U.S. Pat. No. 4,576,384 discloses a split mechanical face seal comprising a pair of seal rings. Each ring comprises segments secured about the circumference by securing means. The rings are non-rigidly supported in an axial direction by resilient support means. At least one of the support means comprises biasing means axially biasing the sealing surface of the rings together.

Additionally, various means are known to connect the mechanical seal to the housing. Typically, such means are integrated into the structure of the stationary component. For example, the gland can have extensions which have holes or slots to receive bolts extending from the stationary housing. Nuts can be used to secure the gland, and thereby secure the seal in place. Above referenced and incorporated U.S. Pat. No. 5,441,282 disclosed removeable clips which can be interposed between the housing bolts and the gland to secure the seal in place. Other disclosures of circumferentially adjustable and/or removeable clip means are disclosed in U.S. Pat. Nos. 4,625,977; 5,071,139; and 5,209,496.

SUMMARY OF THE INVENTION

The present invention is directed to an improved mechanical seal of the type useful to form a seal between a stationary housing and a rotatable shaft having a shaft axis extending through an opening in the housing. The mechanical seal has stationary components and rotatable components. In accordance with the seal of the present invention, the stationary components comprise a stationary seal element having a stationary seal surface and the rotatable components comprise a rotatable seal element having a rotatable seal surface. The stationary and rotatable seal surfaces have substantially equal and oblique, preferably acute, angles to the shaft axis. The seal surfaces oppose each other and are forced together by suitable means to form a mechanical seal.

Additionally, the present invention includes an embodiment where the mechanical seal can be connected to a stationary housing by connector clips. Each clip is connected to a bolt extending from the housing and radially extends from the bolt to contact a radial surface of the stationary components. A nut secured to the bolt presses the clip against the radial surface of the stationary components. Each clip comprises an axial extension located adjacent to the bolt, with the bolt being between the axial extension and the stationary element. The axial extension stabilizes the clip from rotating axially away from the stationary component as the bolt is tightened against the clip.

More specifically, the stationary components of the present invention include a gland extending around the perimeter of the shaft. The gland has a gland seal component, such as a gasket which can sealingly abut against the housing around the shaft. The stationary circumferential seal element is interconnected to the gland. The gland is located on the shaft at a position whereby the stationary seal surface faces the rotatable seal surface. There are means to force the rotatable seal surface against the stationary seal surface. The rotatable components include a sleeve having a shaft side inner wall having an inner perimeter located around and interconnected to the shaft. The rotatable circumferential seal is interconnected to the sleeve.

The rotatable seal surface is at a rotatable seal surface angle to a plane perpendicular to the shaft axis, and the stationary seal surface is at a stationary seal surface angle to the plane perpendicular to the shaft axis. The stationary seal surface angle and rotatable seal surface angle are oblique, preferably acute, to the plane perpendicular to the shaft axis and are substantially equal. The opposing seal surfaces thereby form a mechanical seal at an oblique angle, preferably an acute angle, to the plane perpendicular to the the shaft axis.

The formation of the mechanical seal at an oblique, preferably acute, angle to the plane perpendicular to the shaft axis results in a seal which resists leaking. This adavantage is particularly apparant when the mechanical seal of the present invention is used in applications where there is large equipment, high pressures, eccentric rotation of the shaft, and the like. The angular configuration of the abutting seal surfaces is believed to cause the seal to tend to self align around the shaft axis. In effect one surface is conical fitting into a matching reverse conical seal surface forcing the seal to self align. This helps to prevent the formation of wide tracking of the opposing seal elements relative to each other. As discussed above the formation of a wide track wear pattern can result in a premature seal leak.

The mechanical seal of the present invention further comprises a means, preferably an elastic means, to force the rotatable seal surface into contact with the opposing stationary seal surface. Preferably, at least one elastic means is located to assert an axial force on at least one of the stationary and rotatable seal elements.

In a preferred mechanical seal, the rotatable seal element further comprises a rotatable seal element radially projecting surface and the elastic means comprises at least one rotatable seal disc axially located between the sleeve and the rotatable seal element radially projecting surface. Preferably, there are means to radially restraint said rotatable seal disc in contact with the shaft.

Alternatively, and preferably in addition to the elastic rotatable seal disc, the elastic means comprises at least one elastic stationary seal disc. The stationary seal element can further comprise a stationary seal element radially projecting surface. At least one elastic stationary seal disc can be axially located between the gland and the stationary seal element radially projecting surface. Preferably, there are means to radially restrain the said stationary seal disc. There can be at least one elastic stationary disc and in specific embodiments there are at least two stationary seal discs with each adjacent disc having means to restrain radial movement relative to each other.

The mechanical seal of the present invention can be a conventional seal made of single piece elements or a split mechanical seal where the various elements can be made of more than one piece. Typically, in a split seal each rigid element is made of two separate circumferential pieces, and each elastic element has one split. Split seals have the advantage of being able to be mounted around a shaft without having to be threaded over the shaft end. This enables the seal to be installed without disassembling equipment attached to the shaft ends, i.e., the motor from the pump.

The present invention also includes an improved mechanical seal of the type useful to form a seal between a stationary housing and a rotatable shaft extending through the housing and having a shaft axis. The mechanical seal has rotatable components and stationary components. There are connector clips between the stationary components of the seal and bolts to interconnect the seal to the housing. The connector clips comprise a radial extension having a seal end, and a bolt end having an opening to receive the bolt. A radial seal surface extends from the bolt to the seal end to be in contact with an opposing stationary component radial surface. There is a radial bolt surface opposite the radial seal surface whereby a nut secured to the bolt presses on the bolt surface of the clip which causes the clip radial seal surface to press against the stationary component radial surface. The clip further comprises an axial extension from the radial seal surface at the bolt end opposite the seal end with at least part of the opening to receive the bolt located between the axial extension and the seal end. Optionally, the radial seal surface of the connector clips and the opposing surface of the stationary components comprise opposing surface extensions and openings to receive the extensions.

DESCRIPTION OF THE PREFERRED EMBODIMENTS

Figure 1:
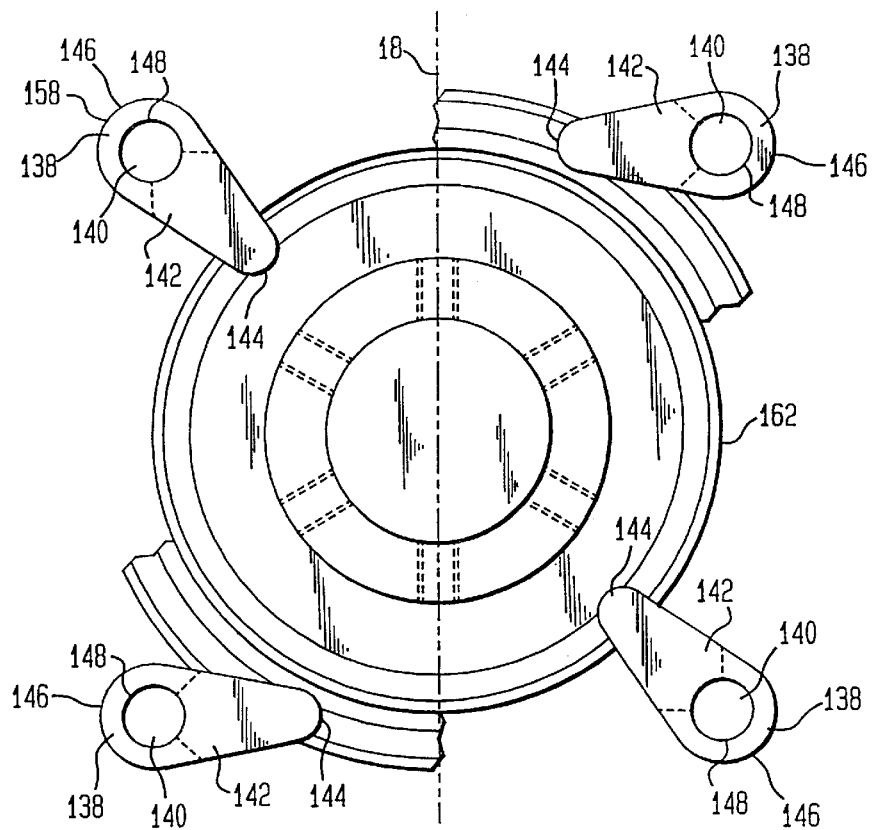
FIG. 1 is a top view of the mechanical seal of the present invention showing the top of the clips holding the seal in place.

The preferred embodiments of the present invention will be appreciated by those skilled in the art by reference to FIGS. 1–10.

The preferred mechanical seal of the present invention is shown forming a seal on an apparatus, such as a pump, between a stationary housing 10 and a rotatable shaft 14 having a shaft axis 18. Housing 10 has an outer surface 20 The shaft 14 has a shaft perimeter surface 22 and extends through an opening 24 in the housing 10

The mechanical seal has rotatable components 26 and stationary components 30. The rotatable components 26 are interconnected to shaft 14 by suitable means such as set screws and rotate with the shaft 14. The stationary components 30 are interconnected to the housing and do not rotate. The stationary assembly of components and rotatable assembly of components are positioned relative to one another to meet at respective seal surfaces, i.e., a rotatable seal surface 34 and a stationary seal surface 36 to form a mechanical seal.

Figure 2:
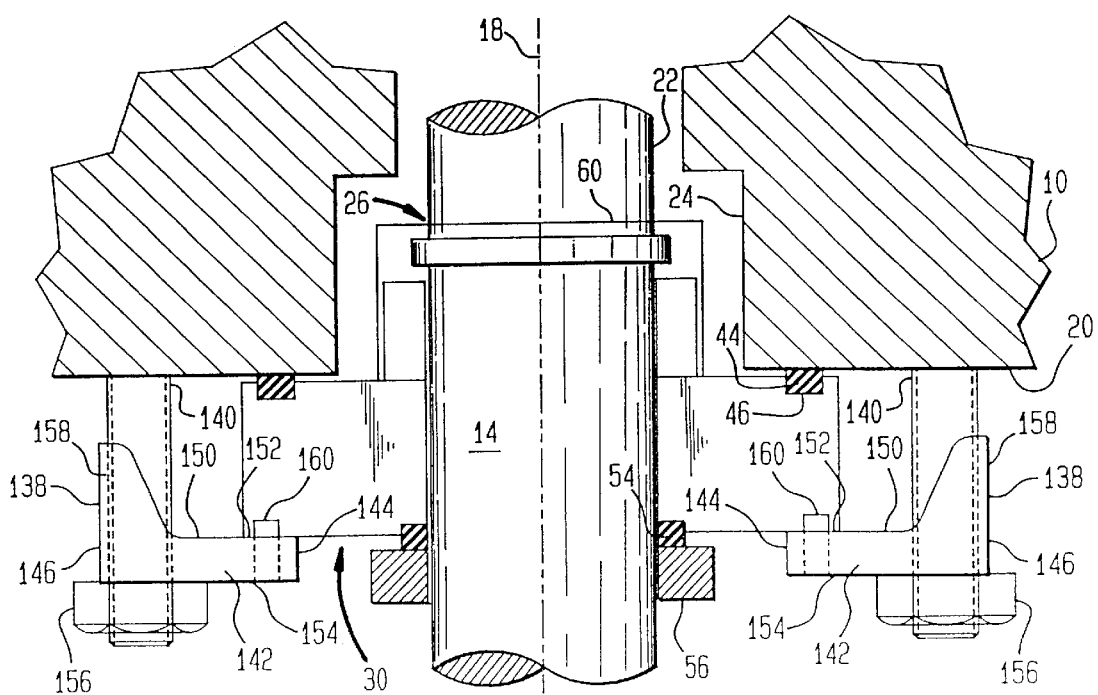
FIG. 2 is a partial sectional side view of the mechanical seal of the present invention generally showing the location of the stationary components and rotatable components, and a side view of the clips holding the seal in place.
Figure 3:
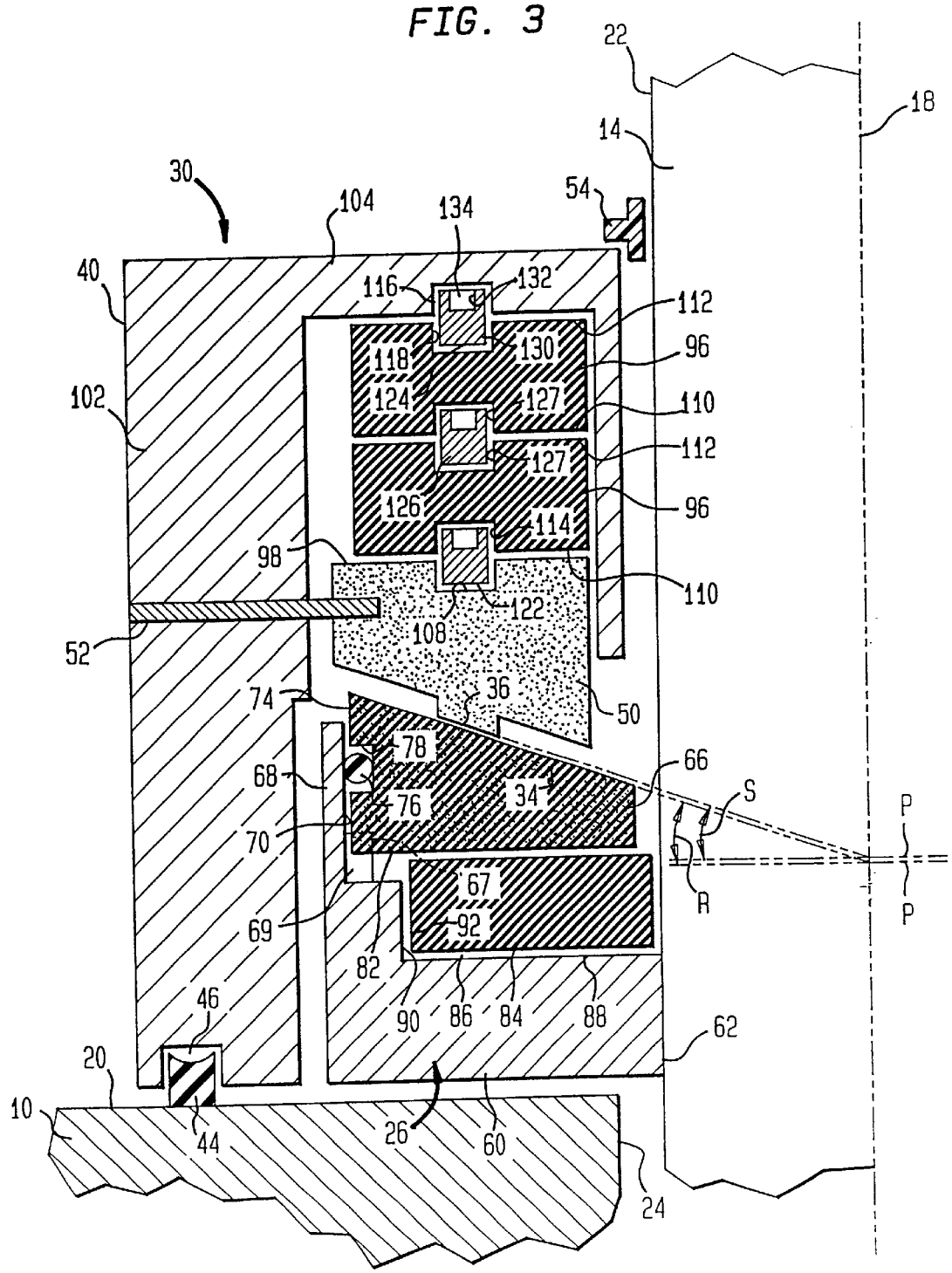
FIG. 3 is a sectional view of the mechanical seal assembled to form a seal between a machine housing and a rotatable shaft extending from the housing.
Figure 4:
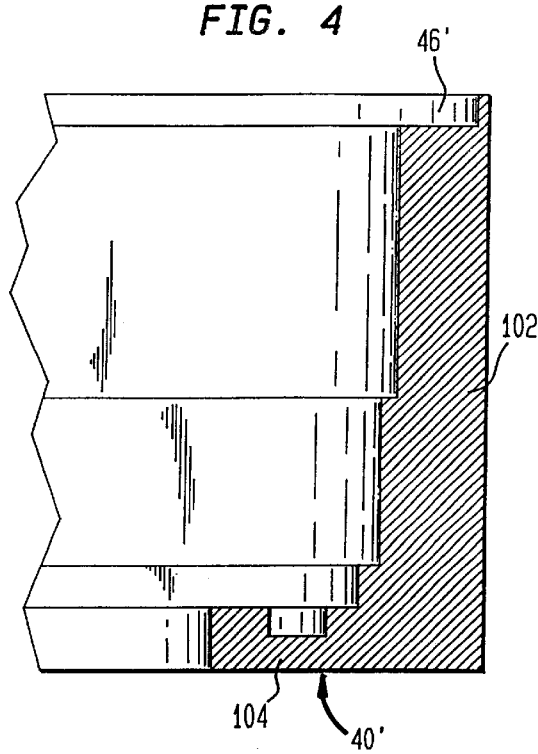
FIG. 4 is a sectional view of an alternate embodiment of a gland.
Figure 5:
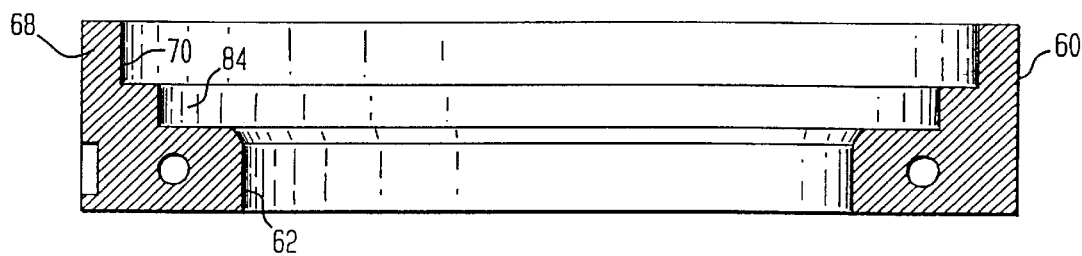
FIG. 5 is a sectional view of a sleeve.
Figure 6:
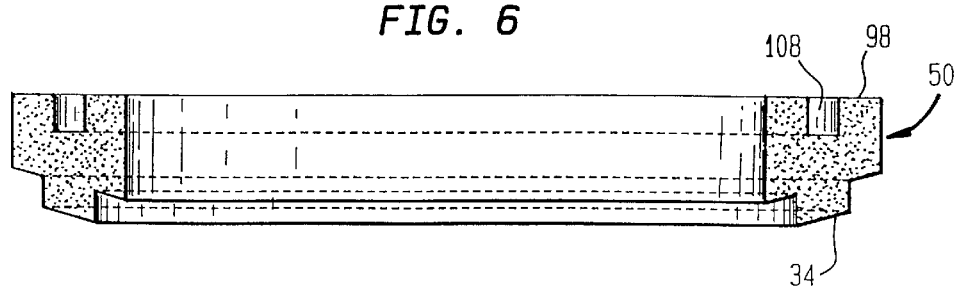
FIG. 6 is a sectional view of stationary seal element.
Figure 7:
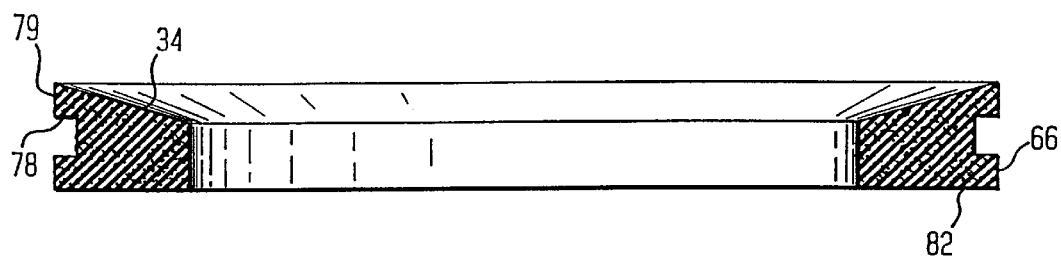
FIG. 7 is a sectional view of a rotatable seal element.
Figure 8:
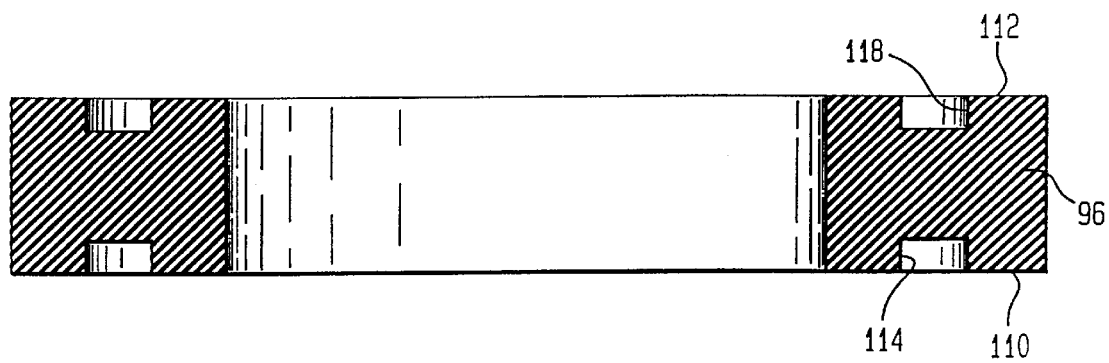
FIG. 8 is a sectional view of a stationary seal disc.
Figure 10:
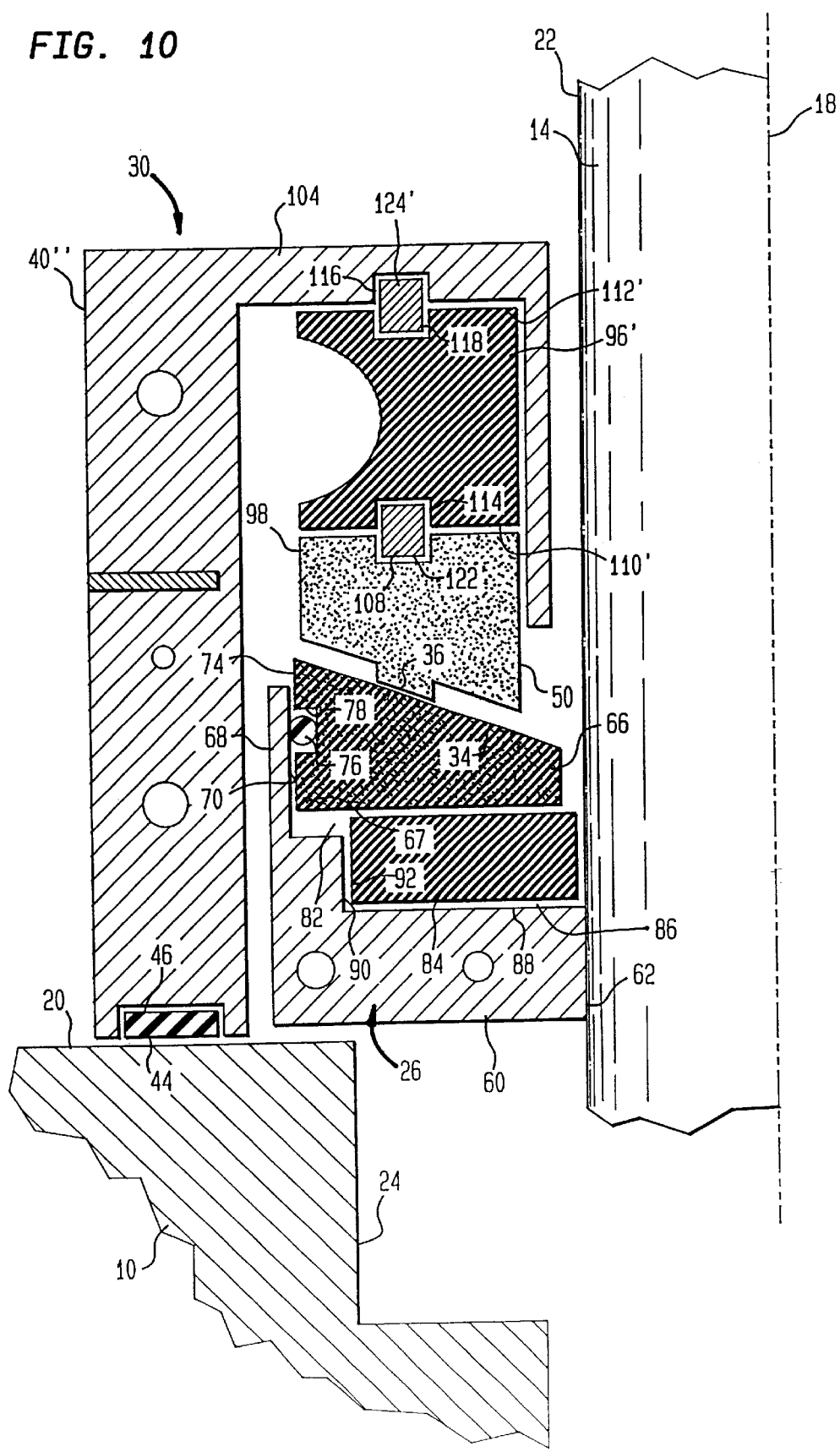
FIG. 10 is an a sectional view of an alternate embodiment of the present invention where the stationary seal disc is designed according to the description in U.S. Pat. No. 5,441,282.

The stationary components 30 include a gland 40 extending around the perimeter surface 22 of the shaft 14. Alternative, glands 40' and 40" are shown in FIGS. 4 and 10. The gland 40 has a gland seal component, such as a gland gasket 44 located in gland gasket slot 46. The gland gasket 44 can sealingly abut against the housing 10 around the shaft 14. A stationary circumferential seal element 50 is directly or indirectly interconnected to the gland 40 by suitable means such as at least one pin or opposing slots and extensions in the seal element 50 and gland 40. The seal element 50 is illustrated in FIGS. 3, 6 and 10. FIG. 3 shows seal element 50 interconnected to gland 40 by pin 52. The stationary seal element 50 has a stationary seal surface 36. The stationary seal surface 34 is at a stationary seal surface oblique angle "S" to the plane "P" perpendicular to the shaft axis 18. The gland 40 can be axially centered around shaft 14 using a spacer means such as spacer 54 which can be interconnected to the gland 40. FIG. 2 shows the spacer 54 connected between gland 40 and collar 56. The spacer 54 can be made of a suitable material such as carbon filled polytetrafluoroethylene or carbon filled phenolic resin.

The rotatable components 26 include a sleeve 60 having a shaft side inner wall 62 having an inner perimeter located around and interconnected to the shaft 14. There is a rotatable circumferential seal element 66 interconnected to the sleeve 60. The rotatable seal element 66 can be interconnected to the sleeve by suitable means such as at least one pin or opposing grooves or slots and extensions. FIG. 3 shows seal element 66 interconnected to sleeve 60 by sleeve ribs 69 interconnected into seal grooves 67. The sleeve 60 further comprises a circumferential outer sleeve wall 68 having an outer sleeve wall circumferentially projecting inner surface 70. The rotatable seal element 66 comprises a circumferentially projecting outer wall 74 adjacent to the outer sleeve wall inner surface 70. A seal means such as "O" ring 76 is located in "O" ring slot 78 between the sleeve wall inner surface 70 and the seal element outer wall 74. The rotatable seal element 66 has a rotatable seal surface 34. The rotatable seal surface 34 is at a rotatable seal surface oblique angle "R" to a plane "P" perpendicular to the shaft axis 18. The stationary seal surface angle "S" and rotatable seal surface angle "R" are oblique, and preferably acutes to the plane perpendicular to the shaft axis 18 and are substantially equal. "R" and "S" are preferably acute angles, with preferred angles of from 1 to 30, more preferably 5 to 20, yet more preferable from 8 to 15 and most preferable from 9 to 13 degrees. Where "R" and "S" are obtuse angles they are preferably 150 to 179, more preferably 160 to 175, yet more preferably 165 to 172 and most preferably 167 to 171 degrees. The opposing seal surfaces 34 and 36 thereby form a mechanical seal at an oblique angle, preferably an acute angles to the plane "P" perpendicular to the the shaft axis 18. The gland 40 is located on the shaft 14 at a position whereby the stationary seal surface 36 faces the rotatable seal surface 34. There are means to force the rotatable seal surface 34 against the stationary seal surface 36.

The mechanical seal of the present invention further comprises a means, preferably an elastic means, to force the rotatable seal surface 34 into contact with the opposing stationary seal surface 36. Preferably, at least one elastic means is located to assert an axial force on at least one of the stationary and rotatable seal elements 50 and 66.

Preferably, the rotatable seal element further comprises a rotatable seal element radially projecting surface 82. The elastic means comprises at least one rotatable seal disc 84 axially located between the sleeve 60 and the rotatable seal element radially projecting surface 82.

Preferably, there are means to radially restrain the rotatable seal disc 84 in contact with the shaft 18. The means to radially restrain the said rotatable seal disc 84 can be a sleeve disc groove 86 defined by a sleeve disc groove radially projecting surface 88 and a sleeve disc groove circumferentially projecting surface 90. The rotatable seal disc 84 is located axially between the sleeve disc groove radially projecting surface 88 and the rotatable seal element radially projecting surface 82. The disc 84 has an outer circumferential surface 92 adjacent to the sleeve disc groove circumferntially projecting surface 90. The seal disc 84 can provide sufficient friction to drive seal element 66 without the need of rib 69 and slot 67.

Alternatively, and preferably in addition to the elastic rotatable seal disc 84, the elastic means comprises at least one stationary elastic seal disc 96. The stationary seal element 50 can further comprise a stationary seal element radially projecting surface 98. The stationary elastic seal disc 96 is axially located between the gland 40 and the stationary seal element radially projecting surface 98. There can be at least one stationary elastic disc 96' as shown in FIG. 10, and in specific embodiments there are at least two stationary seal discs 96, as shown in FIG. 3. Each disc, and adjacent disc has means to restrain radial movement. Two discs 96 are preferred to help compensate for eccentric shaft rotation.

In specific and preferred embodiments the gland 40 comprises a gland circumferential wall 102 and a gland radially projecting wall 104 projecting from the gland circumferential wall 102. The at least one stationary sealing disc 96 is located between the radial wall 98 of the stationary seal element 50 and the gland radially projecting wall 104.

Preferably, there are means to radially restrain the stationary seal disc 96. The seal element radially projecting surface 98 has a stationary seal element circumferential slot 108. Each of the at least one stationary seal discs 96 have a radial seal side 110 (110') and a radial gland side 112 (112'). The radial seal side 110 of the disc adjacent to the stationary seal element 50 has a seal side circumferential slot 114 opposite and corresponding to the seal element circumferential slot 108. The gland radially projecting wall 104 has a circumferential gland slot 116. The radial gland side 112 of the disc 96 adjacent to the gland 40 has a gland side circumferential slot 118 opposite and corresponding to the gland circumferential slot 116. There is a stationary seal ring 122 (122') located in the combined slot formed by the stationary seal element slot 106 and the adjacent disc seal side slot 114, and a stationary gland ring 124 (124') located in the combined slot formed by the gland circumferential slot 116 and the adjacent disc gland side circumferential slot 118. Adjacent radial surfaces of the multiple seal discs are interconnected by disc rings 126 in opposing slots 127.

Figure 9:
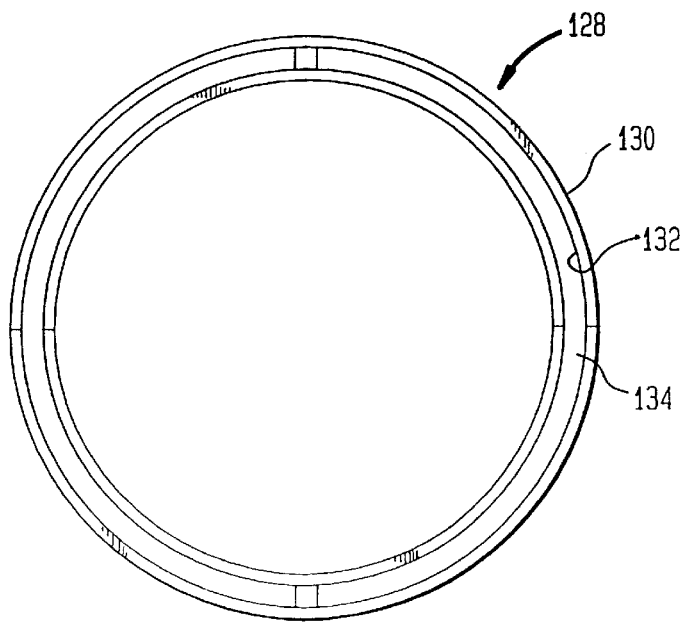
FIG. 9 is a top view an assembly of a stationary seal ring and a stationary seal split ring lock.

FIG. 9 shows a plan view of a typical design for a split seal ring 128 useful as any of seal rings 122, gland ring 124 and/or disc ring 126. The split ring 128 comprises at least two circumferential ring sections 130. Each circumferential section has a circumferential slot 132. Circumferential lock rings 134 fit into the circumferential slot 132. Preferably there are two circumferential lock ring sections 134 located in the slot 132 so that the breaks in the circumferential ring sections 130 are offset from the breaks in the breaks in the circumferential lock rings 134. The circumferential rings 128 restrain radial movement of the seal discs 96. However, the elastic character of the discs 96 permits compensation for any residual eccentricity of the shaft 14.

The various elements of the mechanical seal of the present invention can be made of suitable materials to withstand the environments and conditions which must be encountered. Typically, commercially available elastomeric "O" rings can be used. The sleeve, gland, support ring, collars and other related parts car, be made of metal, preferably steel and most preferably stainless steel. One of the opposing seal elements, either the rotatable seal or the stationary seal is a hard surface made of a material such as silicon carbide while the other is a softer surface such as carbon. Preferably, the rotatable seal is made of carbon and the stationary seal is made of silicon carbide. The elastic elements of the present invention can be made of any suitable elastomeric composition or composite. The base elastomers can include chloroprene, nitrile rubber, EPDM or the like.

The mechanical seal of the present invention can be a conventional seal made of single piece elements or a split mechanical seal where the various elements are made of more than one piece. Typically, in a split seal each rigid element is made of two separate circumferential pieces, and each elastic element has one circumferential opening. Split seals have the advantage of being able to be mounted around a shaft without having to be threaded over the shaft end. This enables the seal to be installed without disassembling equipment attached to the shaft ends, i e., the motor from the pump.

The present invention also includes an improved mechanical seal of the type useful to form a seal between a stationary housing 10 and a rotatable shaft 14 extending through the housing 10 and having a shaft axis 18. The mechanical seal has rotatable components 26 and stationary components 30. There are connector clips 138 between the stationary components 30 of the seal and bolts 140 to interconnect the seal to the housing 10. The connector clips 138 comprise a radial extension 142 having a seal end 144, and a bolt end 146 having a bolt end opening 148 to receive the bolt 140. A radial seal surface 150 extends from the bolt 140 to be in contact with an opposing stationary component radial surface 152. There is a radial bolt surface 154 opposite the radial seal surface 152 whereby a nut 156 secured to the bolt 140 presses on the bolt surface 154 of the clip 138 which causes the clip radial seal surface 150 to press against the stationary component radial surface 150.

The clip 138 further comprises an axial extension 158 from the radial seal surface 150 at the bolt end 146 opposite the seal end 144. At least part of the opening 148 to receive the bolt 140 is located between the axial extension 158 and the seal end 144.

Referring to FIGS. 1 and 2, the clip 138 has a bolt hole 148 to receive the bolt 140 and the axial extension 158 is circumferentially greater than 180 degrees around the bolt hole 148. In the event the clip 138 pivots around the bolt 140, the bolt is located so that the bolt 140 is between the seal end 144 and at least part of the axial extension 158. As the nut 156 presses against the bolt surface 154, the seal surface presses 150 against the stationary seal element radial surface 152 at the seal end 144 of the clip. This causes the clip to pivot away from the stationary component of the mechanical seal. The axial extension 158 counters this tendency by pressing against the side of the bolt opposite the seal.

Optionally, the radial seal surface 150 of the connector clips 138 and the opposing surface 152 of the stationary components comprise opposing extensions and openings to receive the extensions. In FIG. 2 there is a clip pin 160 extending from the seal surface 150 of the clip 138. The clip pin 160 is received in a clip slot 162 in the gland radially projecting surface 152. The preferred clip 138 can pivot around the bolt 140 and be used with the same bolt configuration in clip slots 162' at varying distances from the shaft axis 18. By having the axial extension 158 wrap around the bolt 140 for greater than 180 degrees, the bolt 140 is between at least part of the axial extension 158 and the seal end 144 of the clip 138.

The mechanical seal of the present invention can be adapted to virually any size shaft. Typical shafts for which it can be used have diameters ranging from 0.5 to 12 and more inches.

It is to be understood that the foregoing description is merely illustrative of preferred embodiments of the invention, of which many variations may be made by those skilled in the art within the scope of the following claims without departing from the spirit thereof.

What is claimed is:

1. An improved mechanical seal of the type useful for forming a seal between a stationary housing and a rotatable shaft having a shaft axis, the shaft extending through an opening in the housing, the mechanical seal having rotatable components and stationary components, there being connector clips between the stationary components of the seal and bolts to interconnect the seal to the housing wherein the improvement comprises the connector clips comprising a radial extension having a seal end, a bolt end and having an opening to receive the bolt, a radial seal surface extending from the bolt to be in contact with an opposing stationary component radial surface, a radial bolt surface opposite the radial seal surface, the clips further comprising an axial extension from the radial seal surface at the bolt end opposite the seal end with at least part of the opening to receive the bolt located between the axial extension and the seal end, and the axial extension is located to be adjacent to the bolt; wherein the radial seal surface of the connector clips and the opposing surface of the stationary components comprise opposing extensions and openings to receive the extensions; and wherein the connector clip further comprises a clip pin extending from the seal surface disposed to be received in a clip slot in the opposing surface of the stationary components.

2. The improved mechanical seal as recited in claim 1 wherein the opening is a bolt hole and the axial extension is circumferentially greater than 180 degrees around the bolt hole.

3. A clip comprising:

a radial extension having a seal end;

a bolt end having an opening;

a radial seal surface extending from the bolt end;

a radial bolt surface opposite the radial seal surface;

an axial extension from the radial seal surface at the bolt end opposite the seal end with at least part of the opening located between the axial extension and the seal end, and the axial extension is located to be adjacent to the opening and a clip pin extending from the seal surface.

4. The clip as recited in claim 3 wherein the opening is a hole and the axial extension is circumferentially greater than 180 degrees around the hole.

5. An apparatus comprising a bolt and a clip, the clip comprising:

a radial extension having a seal end;

a bolt end having an opening to receive the bolt;

a radial seal surface extending from the bolt end;

a radial bolt surface opposite the radial seal surface;

an axial extension from the radial seal surface at the bolt end opposite the seal end with at least part of the opening to receive the bolt located between the axial extension and the seal end, and the axial extension is located to be adjacent to the bolt and further comprising a clip pin extending from the seal surface.

6. The apparatus as recited in claim wherein the opening is a bolt hole and the axial extension is circumferentially greater than 180 degrees around the bolt hole.

* * * * *